(12) United States Patent
Wadsworth (10) Patent No.: US 10,786,953 B2
(45) Date of Patent: Sep. 29, 2020

(54) METHOD FOR ELIMINATING WRINKLES OR BRIDGING IN COMPOSITE LAMINATE CORNERS OR BENDS

(71) Applicant: SPIRIT AEROSYSTEMS, INC., Wichita, KS (US)

(72) Inventor: Mark Anthony Wadsworth, Sedan, KS (US)

(73) Assignee: SPIRIT AEROSYSTEMS (EUROPE) LIMITED, Wichita, KS (US)

( * ) Notice: Subject to any disclaimer, the term of this patent is extended or adjusted under 35 U.S.C. 154(b) by 95 days.

(21) Appl. No.: 16/050,061

(22) Filed: Jul. 31, 2018

(65) Prior Publication Data

US 2018/0333925 A1    Nov. 22, 2018

Related U.S. Application Data

(63) Continuation of application No. 15/149,334, filed on May 9, 2016, now Pat. No. 10,059,065, which is a
(Continued)

(51) Int. Cl.
*B29C 70/34* (2006.01)
*B29C 70/44* (2006.01)
(Continued)

(52) U.S. Cl.
CPC ............ *B29C 70/342* (2013.01); *B29C 43/56* (2013.01); *B29C 65/002* (2013.01); *B29C 70/06* (2013.01);
(Continued)

(58) Field of Classification Search
CPC ..... B29C 70/342; B29C 70/06; B29C 65/002; B29C 43/56; B29C 70/44; B29C 43/12; B29C 2043/561; B29C 70/30; B29C 53/04; B29C 51/10; B29C 33/308; B29K 2105/06

See application file for complete search history.

(56) References Cited

U.S. PATENT DOCUMENTS

3,414,694 A * 12/1968 Baatrup ................. G05B 19/07
337/1
3,531,752 A * 9/1970 Gourley .................. F28F 13/00
337/139
(Continued)

*Primary Examiner* — Christopher T Schatz
*Assistant Examiner* — Cynthia L Schaller
(74) *Attorney, Agent, or Firm* — Hovey Williams LLP (57) ABSTRACT

A method of manufacturing a composite part having a curved or radiused corner to avoid wrinkling or bridging of outer-most composite plies during consolidation and cure, including laying up composite material on male or female tooling to form two flanges extending at a first angle relative each other and a curved or radiused corner extending between the two flanges. Then the method may include changing an orientation of one or both of the flanges of the composite material, such that the two flanges extend at a second included angle relative each other. The second included angle is smaller than the first angle. The method may also include a step of consolidating the composite material before, after, or during the step of changing the orientation of the composite material to the second angle, as well as a step of curing the composite material oriented at the second angle.

18 Claims, 6 Drawing Sheets

Related U.S. Application Data continuation-in-part of application No. 15/091,631, filed on Apr. 6, 2016, now abandoned.

(51) Int. Cl.
    *B29C 43/56*     (2006.01)
    *B29C 65/00*     (2006.01)
    *B29C 70/06*     (2006.01)
    B29C 43/12     (2006.01)
    B29K 105/06     (2006.01)

(52) U.S. Cl.
    CPC .............. *B29C 70/44* (2013.01); *B29C 43/12* (2013.01); *B29C 2043/561* (2013.01); *B29K 2105/06* (2013.01)

(56) References Cited

U.S. PATENT DOCUMENTS

| | | | | |
|---|---|---|---|---|
| 5,648,109 A | * | 7/1997 | Gutowski | ............. B29C 51/085 156/212 |
| 2006/0249626 A1 | * | 11/2006 | Simpson | ................... B64C 3/20 244/123.1 |
| 2015/0123309 A1 | * | 5/2015 | Rotter | ..................... B29C 70/44 264/230 |

* cited by examiner

METHOD FOR ELIMINATING WRINKLES OR BRIDGING IN COMPOSITE LAMINATE CORNERS OR BENDS

RELATED APPLICATIONS

This non-provisional patent application is a continuation, and claims priority benefit, of U.S. patent application Ser. No. 15/149,334, titled "Method for Eliminating Wrinkles in Composite Laminate," filed May 9, 2016. Application Ser. No. 15/149,334 is a continuation-in-part, claiming priority to U.S. patent application Ser. No. 15/091,631, titled "Method for Eliminating Wrinkles in Composite Laminate," filed Apr. 6, 2016. The above-identified applications are hereby incorporated by reference herein in their entireties.

BACKGROUND

Figure 1:
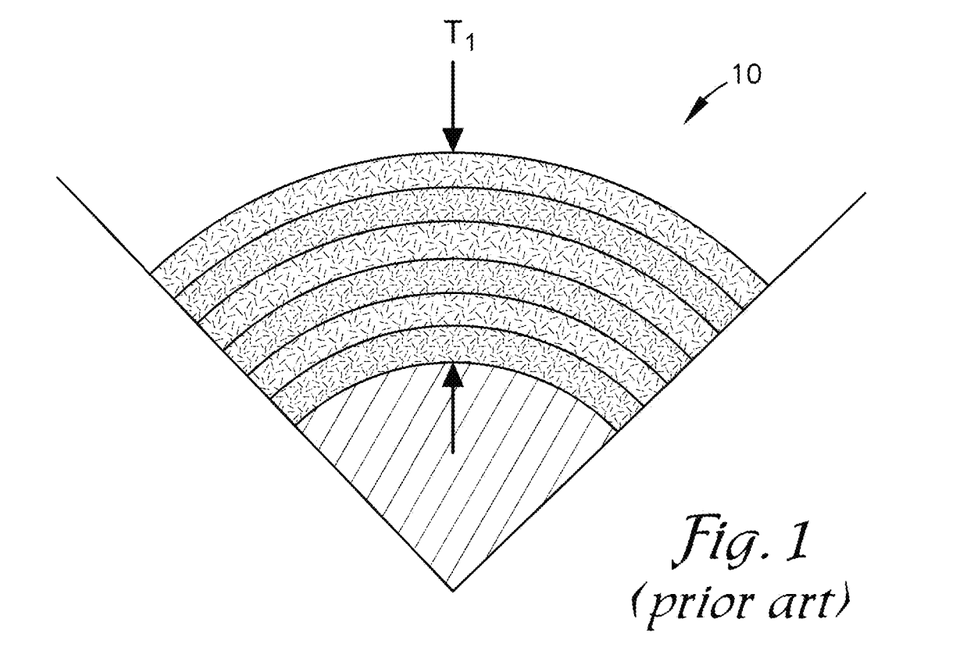
FIG. 1 is a side schematic view of a prior art composite laminate before consolidation on a male tooling.
Figure 2:
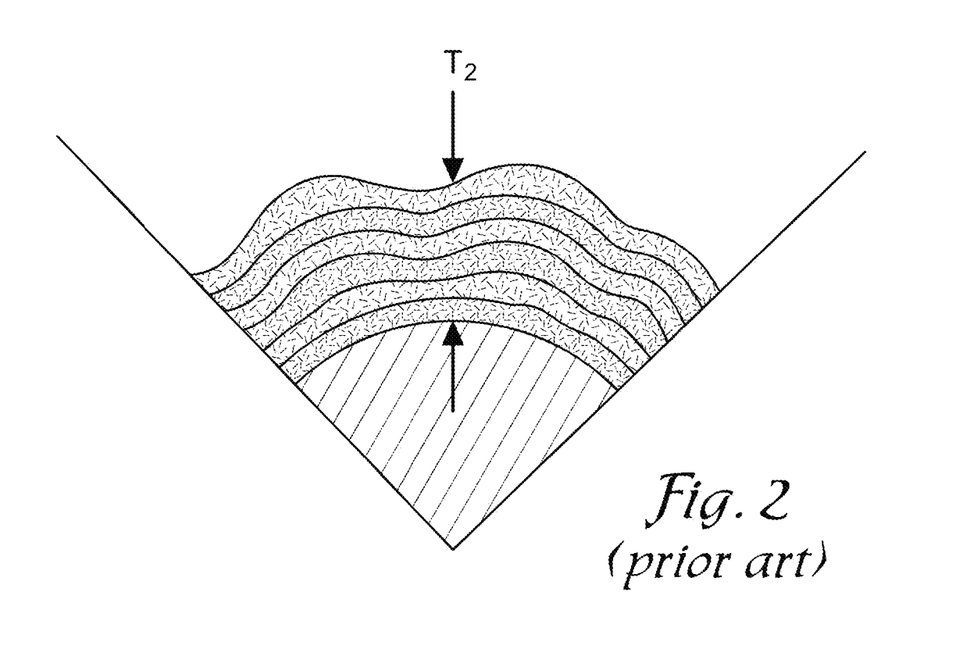
FIG. 2 is a side schematic view of the prior art composite laminate of FIG. 1 after consolidation on the male tooling, depicting resulting excess material on outer-most plies thereof, which can cause undesired wrinkling.
Figure 3:
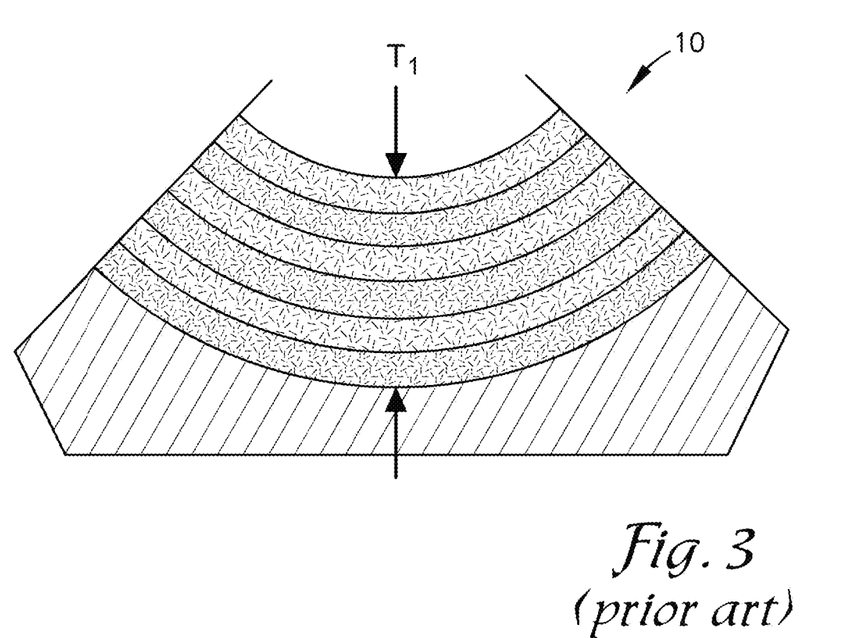
FIG. 3 is a side schematic view of a prior art composite laminate before consolidation on a female tooling.
Figure 4:
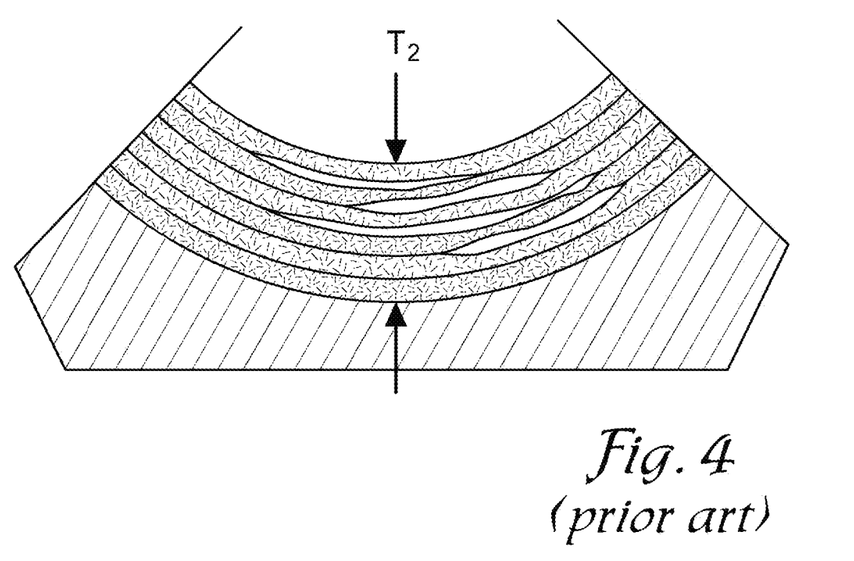
FIG. 4 is a side schematic view of the prior art composite laminate of FIG. 3 after consolidation on the female tooling, depicting resulting material shortage on outer-most plies thereof, which can cause undesired bridging.

Radius wrinkles can form while manufacturing composite parts with curved or radiused corners or bends when sheets of uncured composite laminate are compressed on a male tool via vacuum bagging for curing thereof. As illustrated in FIGS. 1 and 2, when compressed from a first thickness $T_1$ down to a second thickness $T_2$, an excess of material forms primarily on outer-most plies of the composite laminate, resulting in wrinkling of those outer-most plies. Additionally, an undesirable phenomenon referred to as bridging can occur when sheets of uncured composite laminate are compressed on a female tool via vacuum bagging for curing thereof. As illustrated in FIGS. 3 and 4, when compressed from a first thickness $T_1$ down to a second thickness $T_2$, too little material exists on outer-most plies of the composite laminate, causing bridging or gaps between those outer-most plies.

Most techniques for avoiding or minimizing bridging and wrinkling in composite parts involve minimizing bulk factor during layup of the composite laminate, which can require substantial labor for compaction cycles and specialized layup techniques. Splices can be used to reduce bridging and wrinkling, but normally are not done on structural parts due to diminished structural integrity and/or added weight associated with the splices. A caul, bag-side assist, or pressure intensifier may be used to minimize bridging, but are not always effective and often result in mark-off on the resulting composite part or wrinkles at an edge where the semi-rigid caul ends.

Thus, there is a need for an improved method of manufacturing composite parts with curved or radiused corners or bends that minimizes wrinkles and bridging of the composite material.

SUMMARY

The present invention solves the above-described problems and provides a distinct advance in the art of composite part manufacture. More particularly, the present invention provides improved tooling and methods for layup and cure of composite parts with angled or curved or radiused corners or bends.

In one embodiment of the invention, a method of manufacturing a composite part may first include a step of laying up composite material in a configuration with two flanges extending at a first angle relative each other and with a curved or radiused corner extending between the two flanges of the composite material. Then the method may include a step of changing an orientation of one or both of the two flanges of the composite material, such that the two flanges extend at a second angle relative each other. The second angle is smaller than the first angle. The method may further include compressing the composite material, thereby consolidating the composite material for cure. Because the second angle is smaller than the first angle, additional tension and/or slack is introduced into outer-most plies of the composite material for avoiding wrinkling and/or bridging during consolidation and curing of the composite material.

In some embodiments of the invention, the method may additionally comprise a step of curing the consolidated composite material in an autoclave. The composite material may be a composite laminate made of a plurality of composite plies stacked together during the laying up step. Furthermore, the step of laying up the composite material may be performed on a male or female tooling. Furthermore, changing the orientation of one or both of the two flanges of the composite material may be accomplished by transferring the composite material to another male or female tooling, removing or inserting a wedge insert between one of the two flanges and the male tooling or female tooling, or actuating at least one surface of the male tooling or the female tooling via temperature-activated materials, electromechanical actuation, pneumatic actuation, or hydraulic actuation. Compressing the composite material oriented with the second angle may also include vacuum bagging the composite material and inducing a pressure differential to compress the vacuum bag against the composite material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

In all embodiments of the invention described herein, composite material or a composite laminate is placed on tooling configured for creating an angle which is slightly larger than a desired angle of a finished cured composite part being formed, thereby providing a desired effect of tensioning composite plies that would tend to wrinkle or bridge otherwise. Specifically, this can result in feeding additional material for outside plies in a female tool radius or reducing an amount of material on outside plies of a male radius. In general, the problems of wrinkling or bridging during composite material consolidation and cure are functions of laminate thickness, radius length, included angle, and amount of thickness change that occurs during cure/consolidation. As the laminate thickness to radius ratio increases, so does a potential for wrinkling or bridging. However, the flexing of the composite material that occurs by changing the tooling angle prior to or during curing and consolidation, as described herein, has exactly a reverse effect on the ply tension as consolidation, and therefore reduces or greatly eliminates wrinkling or bridging in the resulting cured composite part.

Male Tooling Embodiment

Figure 5:
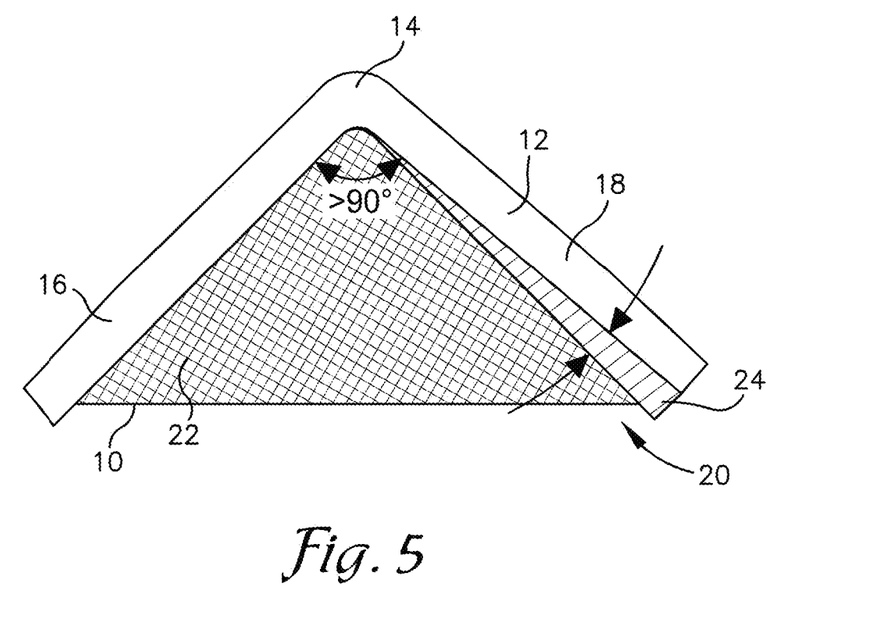
FIG. 5 is a side schematic view of composite laminate laid up on male tooling including a wedge insert, together forming a first angle.
Figure 6:
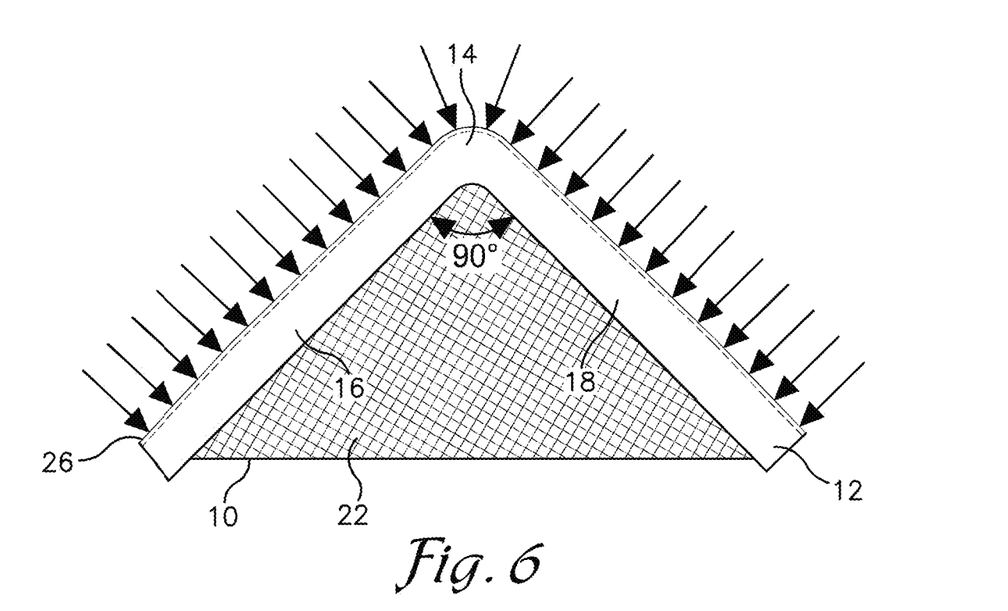
FIG. 6 is a side schematic view of the composite laminate of FIG. 5 being compressed on the male tooling of FIG. 5 with the wedge insert removed, forming a second angle that is less than the first angle.
Figure 7:
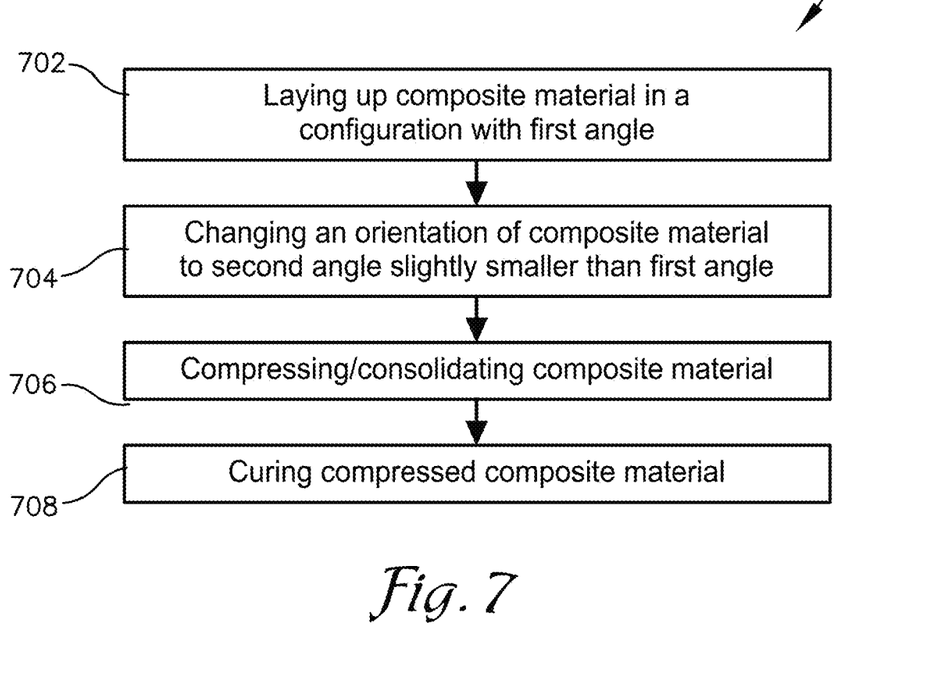
FIG. 7 is a flow chart describing a method of manufacturing a composite part having a curved or radiused corner in accordance with an embodiment of the present invention.

Embodiments of the present invention, as illustrated in FIGS. 5-7, include a male tooling 10 and a method 700 for minimizing wrinkles in composite material 12 when forming a composite part with curved or radiused corners 14 or bends. The curved or radiused corners 14 of the composite part may be formed between two flanges 16, 18 of the composite part. The flanges 16,18 may or may not be substantially planar and be formed at any angle relative to each other. In some embodiments of the invention, the flanges 16,18 of the composite part being formed are made to from an approximately 90 degree angle, with the curved radiused corner 14 between the flanges 16,18 extending approximately 90 degrees or approximately one-quarter of a circle. Although illustrated in FIGS. 5-10 as having substantially planar flanges and a radiused corner, a composite part which does not have flat flanges or circular radiused corners would still fall within the scope of this invention and benefit from using a more open mold (e.g., first angle) prior to consolidation to reduce bridging and wrinkling when cured on a more closed mold (e.g., second angle).

The composite material 12 may include fiber-reinforced polymers such as a carbon-fiber-reinforced polymer or other fiber-reinforced plastics. In some embodiments of the invention, the composite material 12 may be composite laminate composed of a plurality of composite plies stacked together. The plies may include an inner-most ply which may rest against a surface of the male tooling 10 and an outer-most ply forming a surface of the composite laminate opposite the inner-most ply. A thickness of the composite laminate may be any thickness desired. In one embodiment of the invention, the thickness of the composite laminate (prior to consolidation) may be greater than approximately one inch. In another embodiment of the invention, the thickness of the composite laminate (prior to consolidation) may be greater than approximately one-half inch.

In one embodiment of the invention, the male tooling 10 may include a layup tool 20 and/or a curing tool 22, each having a convex curved or radiused corner. The layup tool 20 and the curing tool 22 may each be made of a substantially rigid material configured for supporting the composite material 12 prior to and/or during curing thereof. Specifically, the layup tool 20 may have two planar surfaces and a radiused corner therebetween, while the curing tool 22 also has two planar surfaces and a radiused corner therebetween. The radiused corner of the layup tool 20 may have a greater angle (i.e., be larger, in degrees) than the radiused corner of the curing tool 22. Alternatively, the layup tool 20 may include the curing tool 22 with an insert 24, as illustrated in FIG. 5, such that the insert 24 placed on one of the planar surfaces of the curing tool 22 creates a larger angle for layup than merely the curing tool 22 alone. Then when the insert 24 is removed after layup, the composite material 12 on the curing tool 22 may be vacuum bagged and compressed at the smaller angle of the curing tool 22, as later described herein.

In yet another embodiment of the invention, the male tooling 10 may include a single male-shaped mold with a radiused corner connecting two substantially-planar surfaces, and the male tooling 10 may have a first configuration for layup of the composite material 12 and a second configuration for compaction and curing of the composite material 12. The angle between the two substantially-planar surfaces of this male tooling 10 may be larger in the first configuration and smaller in the second configuration. Specifically, electromechanical, pneumatic, and/or hydraulic actuators (not shown) may be used to actuate the male tooling 10 from the first configuration to the second configuration and from the second configuration to the first configuration. For example, one or both of the substantially-planar surfaces of the male tooling 10 may be actuatable via the actuators to move clockwise and/or counter-clockwise toward and/or away from each other. Pneumatic actuators may use pressure differential between autoclave pressure and port pressure (ambient air) for actuating the male tooling 10 without the need for additional autoclave plumbing or wiring.

In still another embodiment of the invention, the male tooling 10 may be made of a low-melt alloy or phase-change material in combination with springs or weights to actuate movement of one or both of the substantially-planar surfaces of the male tooling 10 at a specific threshold temperature in a passive manner. This may enable each of a plurality of male tooling components in a load to actuate at an appropriate time based on the threshold temperatures selected for the material of each of those tools. Furthermore, in some embodiments of the invention, bi-metallic (coefficient of thermal expansion differential) strip may be used to release pressure, weight, or springs that actuate the male tooling 10 at the appropriate times without operator intervention.

In use, composite material may be laid up onto the layup tool 20 at the first angle. Next, either the composite material may be transferred to the curing tool having the second angle, or the layup tool may be actuated such that the radiused corner thereof changes from the first angle to the second angle. For example, as described above, this actuating may include either the wedge 24 being removed or some other form of actuation of one or both planar surfaces of the layup tool 20 via actuators, changes in structural properties of the material, or any combination thereof. Next, the composite material may be compressed against the curing tool or against the layup tool placed at the second angle and cured to form a rigid composite part.

The chart of FIG. 7 depicts the steps of an exemplary method 200 for forming a composite part with a curved or radiused corner. The steps of the method 200 may be performed in the order shown, or they may be performed in a different order. In addition, some steps may not be performed or may be separated in time by other intermediate steps not depicted.

The method 700 may include a step of laying up the composite material 12 in a configuration with the two flanges 16,18 extending at a first angle relative each other and with the radiused corner 14 extending between the two flanges 16,18 of the composite material 12, as depicted in block 702. Specifically, as described above, the composite material 12 may be laid up on the layup tool 20 and/or the cure tool 22 with the insert 24 added to a surface thereof, thus increasing the angle on which the composite material 12 is placed. However, in some alternative embodiments of the invention, the method 700 may be performed on tooling with angled surfaces cooperatively forming non-radiused or otherwise curved corners or bends without departing from the scope of the invention.

Next, the method 700 may include a step of changing an orientation of one or both of the two flanges of the composite material 12, such that the two flanges extend at a second angle relative each other, as depicted in block 704. The second angle is smaller than the first angle, such that plies of the composite material furthest from the layup tool 20 or cure tool 22 are provided with additional tension in step 704 to counteract wrinkling during consolidation thereof toward the male tooling 10. As noted above, a number of male tooling 10 and techniques may be used to accomplish this change from the first angle to the second angle without departing from the scope of the invention.

For example, in some embodiments of the invention, the step of changing the orientation may include transferring the composite material 12 from the layup tool 20 having the first angle to the curing tool 22 having the second angle. In other embodiments of the invention, as illustrated in FIGS. 5 and 6, the step of changing the orientation includes removing the insert 24 from the curing tool 22, thereby decreasing the angle presented to the composite material 12, from the first angle in FIG. 5 to the second angle in FIG. 6.

In other embodiments of the invention, the step of changing the orientation may include electromechanically, pneumatically, or hydraulically actuating one or both of the planar surfaces of the male tooling, such that the two flanges of the composite material 12 extend at the second angle relative each other. This actuation may occur prior to consolidation and curing of the composite material 12 or during. For example, this actuation may occur in an autoclave or oven during curing of the composite material 12 and before gelation of the composite material 12.

In yet another embodiment of the invention, the step of laying up the composite material 12 is may be performed by a phase change layup tool made of low-melt alloy or phase-change material coupled with springs and/or weights as described above. Thus, the step of changing the orientation may include heating the phase change layup tool on which the composite material 12 was placed to a specific phase change threshold temperature which actuates the phase change layup tool to move the composite material 12 from the first angle to the second angle in a passive manner. For example, the specific phase change threshold temperature may be naturally provided to the phase change layup tool in an autoclave during curing of the composite material 12 and before gelation of the composite material 12.

In another embodiment of the invention, the step of laying up the composite material 12 may be performed on a layup tool having a surface attached to a bi-metallic strip. The bi-metallic strip may be configured to release pressure, weight, or springs that actuate the surface of the layup tool at predetermined times or temperatures without user intervention.

The method 700 may further include a step of compressing the composite material 12, as depicted in block 706, thus consolidating the composite material 12. Specifically, the composite material 12 may be compressed against a surface of the male tooling 10 before, after, or during the step of changing the orientation thereof to the second angle, as in step 704. However, the compressing or consolidating of the composite material 12 may be performed using any method known in the art. For example, an impermeable material 26 or vacuum bag may be placed over the composite material and sealed to the male tooling 10 (e.g., the curing tool 22), and air or atmosphere may be removed from within the impermeable material 26, such that the impermeable material 26 compresses toward the male tooling 10, consolidating the composite material. Additionally or alternatively, another sheet or portion of the impermeable membrane 26 or vacuum bag may also be placed between the male tooling 10 and the composite material 12, facilitating release of the composite material 12 from the male tooling 10 after consolidation and/or curing thereof. However, any method of creating a pressure differential that compresses the impermeable membrane against the composite material 12 for consolidation thereof may be used without departing from the scope of the invention.

Finally, the method 700 may include a step of curing the composite material 10, as depicted in block 708. The curing may be performed via heat and pressure in an autoclave or oven. Additionally or alternatively, the curing may include other method steps and techniques known in the art. As earlier noted, in some embodiments of the invention, the specific phase change threshold temperature may be provided to the layup tool 20 in the autoclave or oven during curing of the composite material 12 and before gelation of the composite material 12.

Figure 8:
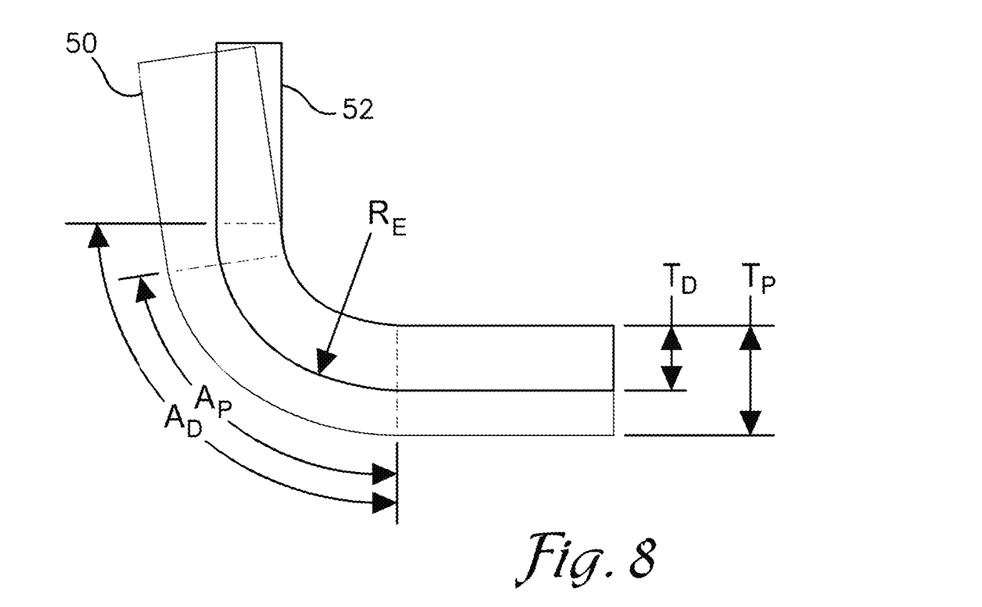
FIG. 8 is a schematic depiction of the composite laminate of FIG. 5 both before and after consolidation, labeled according to measurements used to calculate a layup angle desired.

In some embodiments of the invention, an equation may define the relationship between the first angle and the second angle. FIG. 8 illustrates the composite material before cure 50 in direct comparison with the composite material after or during cure 52. A mathematical relationship between angles of the composite materials 50 and 52 may also be derived using variables depicted in FIG. 8. Specifically, the exterior angle of the radiused corner before cure and following the laying up step ($A_P$) may be calculated as a product of an exterior angle of the radiused corner after the curing step ($A_D$) and a desired exterior surface radius of the radiused corner ($R_E$) divided by a sum of a thickness of the composite material 12 prior to the step of compressing ($T_P$), a negative desired thickness of the composite material after the step of compressing ($T_D$), and the desired exterior surface radius ($R_E$), as provided in Equation 1, below:

$$(A_P) = A_D R_E / (R_E + T_P - T_D) \qquad (1)$$

In some embodiments of the invention, the exterior angle ($A_P$) may be in a range of 48.0 to 117.1 degrees, 66.7 to 96.4 degrees, or 77.4 to 86.7 degrees. The exterior angle ($A_D$) may be in a range of 60 to 120 degrees, 80 to 100 degrees, or 89 to 91 degrees. The desired exterior surface radius ($R_E$) may be in a range of 0.25 to 2.75 inches, 0.75 to 2.25 inches, or 1.25 to 1.75 inches. Furthermore, in some embodiments of the invention, the thickness prior to compression ($T_P$) is in a range of 0.188 to 1.444 inches, 0.525 to 1.209 inches, or 0.813 to 0.963 inches, and the desired thickness after compression ($T_D$) is in a range of 0.125 to 1.375 inches 0.375 to 1.125 inches, or 0.625 to 0.875 inches. Furthermore, in some embodiments of the invention, a bulk factor of the composite material 12 may be in a range of 1.05 to 1.5, 1.075 to 1.4, or 1.1 to 1.3. The bulk factor is the ratio of thickness of the composite material before compaction ($T_P$) to the thickness after compaction ($T_D$). However, any of these variables may be outside of the ranges provided herein or could be a curve other than a radius without departing from the scope of the invention.

In one specific example embodiment of the invention, the composite material 12 may have a nominal design thickness ($T_D$) of 0.75 inches, a nominal bulk factor of 120% (i.e., bulk factor of 1.2), an exterior part radius ($R_E$) of 1.5 inches, and a nominal flange angle ($A_D$) of 90 degrees. These parameters may result in a nominal layup angle ($A_P$) of 81.8 degrees. However, other values may be used without departing from the scope of the invention.

Female Tooling Embodiment

Figure 9:
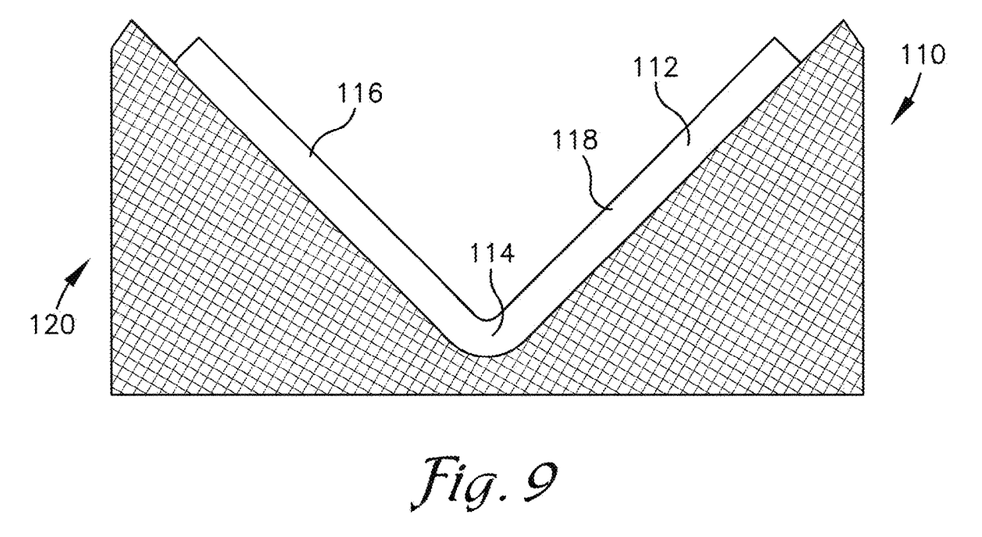
FIG. 9 is a side schematic view of composite laminate laid up on a female layup tool having a first angle.
Figure 10:
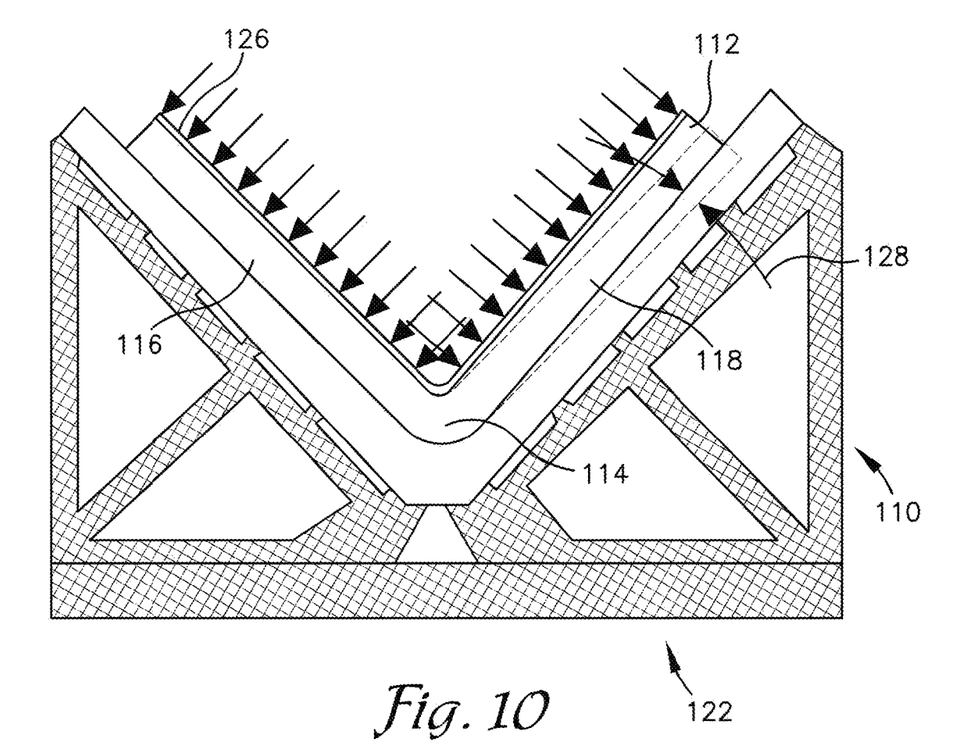
FIG. 10 is a side schematic view of the composite laminate of FIG. 9 being compressed on a female curing tool forming a second angle that is less than the first angle.

Embodiments of the present invention, as illustrated in FIGS. 9-10, include a female tooling 110 for minimizing bridging in composite material 112 when forming a composite part with radiused corners 114 also referred to as curved corners or curved or radiused bends. The primary difference between the male tooling embodiment above and the female tooling embodiment is that the female tooling 110 provides a concave surface for forming the curved or radiused corner 114 of a composite part may be formed between two flanges 116, 118 of the composite part. The flanges 116,118 may be formed at any angle relative to each other and may be substantially planar and/or may have any desired curves or contours for a given part or application. In one example embodiment of the invention, the radiused corner 114 between the flanges 116,118 is approximately 90 degrees or approximately one-quarter of a circle. However, the radiused corner 114 may have other non-circular curvatures without departing from the scope of the invention.

In one embodiment of the invention, the female tooling 110 may include a layup tool 120 and a curing tool 122, each having a concaved radiused corner, as illustrated in FIGS. 9 and 10. The layup tool 120 and the curing tool 122 may each be made of a substantially rigid material configured for supporting the composite material 112 prior to and/or during curing thereof. Specifically, the layup tool 120 may have two flange surfaces and a substantially curved or radiused corner therebetween, while the curing tool 122 also has two flange surfaces and a curved or radiused corner therebetween. As illustrated in FIG. 9, the radiused corner of the layup tool 120 may have a greater included angle (i.e., be larger, in degrees, or more open of an angle in general) than the curved or radiused corner of the curing tool 122, as illustrated in FIG. 10. That is, the tooling of FIG. 9 may orient the composite material 112 in a first angle, and the tooling of FIG. 10 may orient the composite material 112 in a second angle that is smaller than the first angle. A resulting deformation angle 128 when the composite material is moved from the first angle and the second angle is illustrated in FIG. 10.

Alternatively, the curing tool 122 may include the layup tool 120 and an insert or wedge (not shown) such that the insert or wedge placed on one of the planar surfaces of the layup tool 120 creates a smaller angle for curing than merely the layup tool 120 alone. Then when the insert or wedge is added after layup, the composite material 112 on the layup tool 120 (forming the curing tool 122) may be vacuum bagged and compressed at the smaller angle of the resulting curing tool 122, as later described herein.

In yet another embodiment of the invention (not shown), the female tooling 110 may include a single female-shaped mold with a radiused or curved corner connecting two flange surfaces, and the female tooling 110 may have a first configuration for layup of the composite material 112 and a second configuration for compaction and/or curing of the composite material 112. The angle between the two flange surfaces of this female tooling 110 may be larger in the first configuration and smaller in the second configuration. Specifically, electromechanical, pneumatic, and/or hydraulic actuators (not shown) may be used to actuate the female tooling 110 from the first configuration to the second configuration and from the second configuration to the first configuration. For example, one or both of the flange surfaces of the female tooling 110 may be actuatable via the actuators to move clockwise and/or counter-clockwise toward and/or away from each other. Pneumatic actuators may use pressure differential between autoclave pressure and port pressure (ambient air) for actuating the female tooling 110 without the need for additional autoclave plumbing or wiring.

In still another embodiment of the invention, the female tooling 110 may be made of a low-melt alloy or phase-change material in combination with springs or weights to actuate movement of one or both of the substantially-planar surfaces of the female tooling 110 at a specific threshold temperature in a passive manner. This may enable each of a plurality of female tooling components in a load to actuate at an appropriate time based on the threshold temperatures selected for the material of each of those tools. Furthermore, in some embodiments of the invention, bi-metallic (coefficient of thermal expansion differential) strip may be used to release pressure, weight, or springs that actuate the female tooling 110 at the appropriate times without operator intervention.

In use, the female tooling 110 may be used according to the method 700 described above, using a larger angle or a large radiused or curved corner for layup of the composite material 112, and then using a smaller angle or a sharper radiused or curved corner for compaction and curing. For example, as in the method above, once the orientation of the composite material 112 is changed from the first angle to the second angle, impermeable material 126 may be placed over the composite material 112 for consolidation thereof via an induced pressure differential. However, use of the female tooling 110 may differ slightly in precisely how to change from the first angle to the second angle, as described above. For example, when using the insert or wedge described herein, due to the female tooling configuration, instead of removing the insert or wedge in step 704, the step would instead include adding the insert or wedge between the composite material 112 and a surface of the female tooling 110.

Furthermore, the same equation may be used to determine an amount by which the curved or radiused corner should be increased between layup and curing to result in desired reduced bridging of the composite material 112 during curing in the female tooling 110. However, instead of using an exterior radius of the composite material's radiused corner after or during cure ($R_E$), the equation may use an interior radius of the composite material's radiused corner after or during cure ($R_I$). Likewise, ($A_P$) and ($A_D$) may correspond to an included angle of the radiused corner before and during (or after) cure, respectively.

Figure 11:
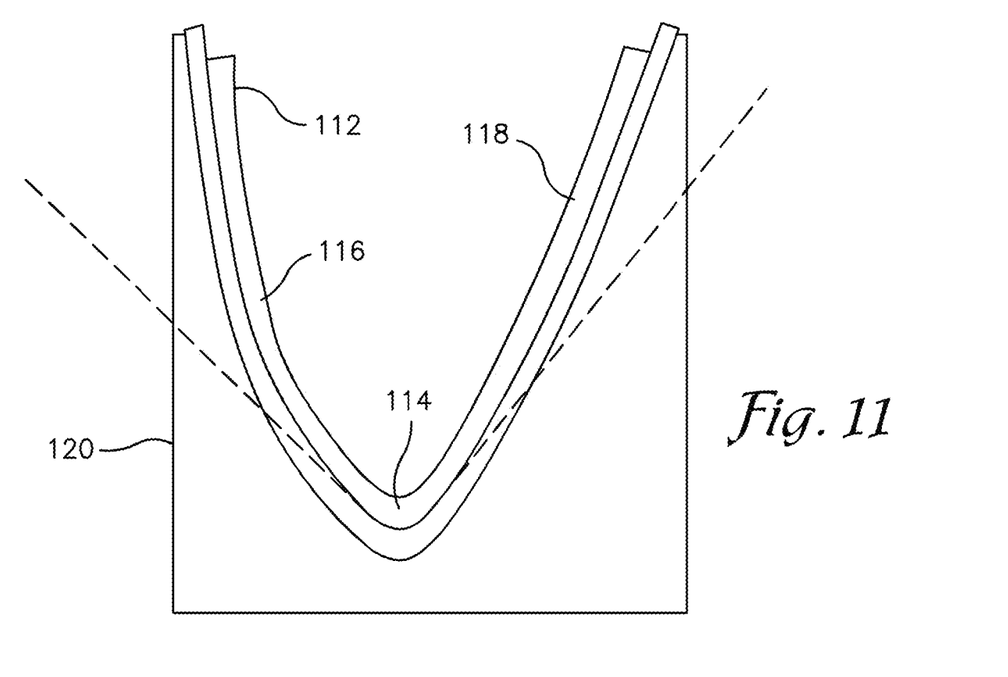
FIG. 11 is a side schematic view of composite laminate laid up on a female layup tool having non-linear flanges extending from a sharply curved bend at a first angle relative to each other.
Figure 12:
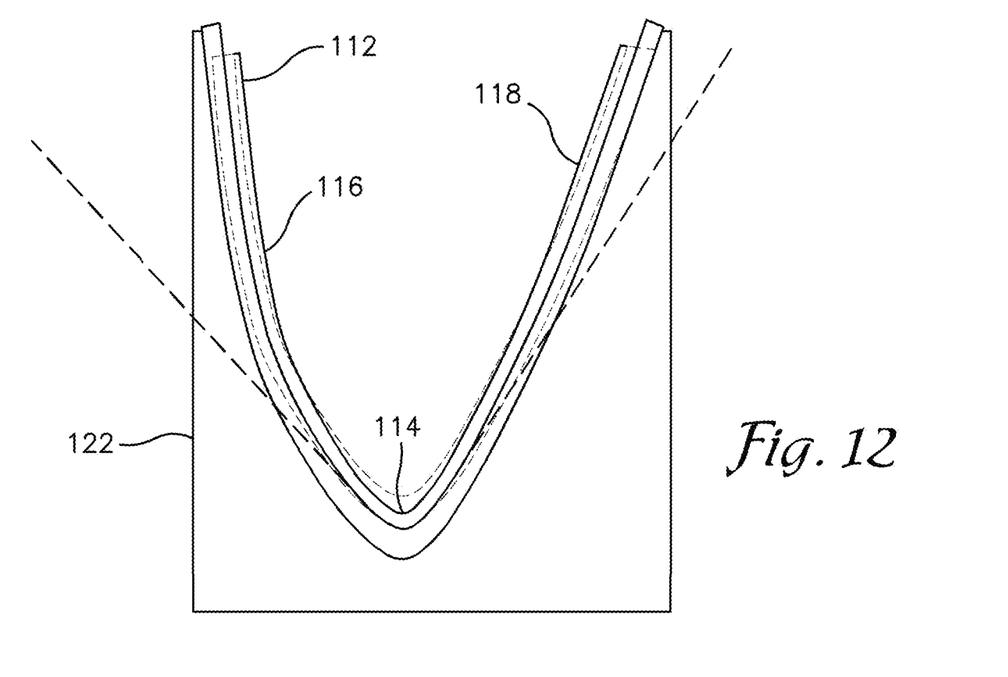
FIG. 12 is a side schematic view of the composite laminate of FIG. 11 being compressed onto a female curing tool forming a second angle that is less than the first angle in FIG. 11.

Although the invention has been described with reference to the embodiments illustrated in the attached drawing figures, it is noted that equivalents may be employed and substitutions made herein without departing from the scope of the invention as recited herein. For example, FIGS. 11 and 12 illustrate an alternative embodiment of the female tooling described above, with the flanges 116,118 having slightly curved contours, and the corner 114 being illustrated as a non-circular curved corner or bend. This illustrates, as noted above, that the corner or bend does not necessarily need to be radiused or follow a circular arc and the flanges do not necessarily need to be planar in order to make use of the methods described herein, as long as the first angle (i.e. degree of openness or distance between the two flanges) during layup is greater than the second angle (i.e., smaller degree of openness or smaller distance between the two flanges) during compaction and/or curing.

Having thus described one or more embodiments of the invention, what is claimed as new and desired to be protected by Letters Patent includes the following:

1. A method of manufacturing a composite part, the method comprising:
   laying up composite material in a configuration with a first flange and a second flange extending from a corner curving between and terminating at the first flange and the second flange such that the corner has an initial arc angle between approximately 48.0 degrees and approximately 117.1 degrees;
   changing an orientation of one or both of the first and second flanges of the composite material, such that the corner has a final arc angle different from the initial arc angle and between approximately 60.0 degrees and approximately 120.0 degrees; and
   compressing the composite material, thereby consolidating the composite material with the corner having the final arc angle.

2. The method of claim 1, wherein the step of changing the orientation comprises transferring the composite material from a layup tool having the initial arc angle to a curing tool having the final arc angle.

3. The method of claim 1, wherein the step of changing the orientation comprises removing inserts from a surface of a layup tool on which the composite material is placed during the step of laying up the composite material.

4. The method of claim 1, wherein the step of changing the orientation comprises at least one of electromechanically, pneumatically, and hydraulically actuating at least one surface of a layup tool on which the composite material was placed during the step of laying up the composite material such that the corner has the final arc angle.

5. The method of claim 4, wherein actuating the at least one surface of the layup tool occurs in an oven during curing of the composite material and before gelation of the composite material.

6. The method of claim 1, wherein the step of laying up the composite material is performed on a layup tool, wherein the layup tool is low-melt alloy or phase-change material coupled with at least one of springs and weights, wherein the step of changing the orientation comprises heating or cooling the layup tool to a specific phase change threshold temperature, in an oven, which actuates the layup tool to move the composite material such that the corner has the final arc angle.

7. The method of claim 6, wherein the specific phase change threshold temperature is provided to the layup tool in the oven during curing of the composite material and before gelation of the composite material.

8. The method of claim 1, wherein the step of laying up the composite material is performed on a layup tool, wherein a surface of the layup tool is attached to a bi-metallic strip configured to release at least one of pressure, weight, and springs that actuate the surface of the layup tool at one of predetermined times and temperatures without user intervention.

9. The method of claim 1, wherein the first and second flanges are contoured.

10. The method of claim 1, wherein the corner is radiused.

11. A method of manufacturing a composite part, the method comprising:
    laying up composite material in a configuration with a first contoured flange and a second contoured flange extending from a corner curving between and terminating at the first contoured flange and the second contoured flange such that the corner has an initial arc angle;
    changing an orientation of one or both of the first and second contoured flanges of the composite material such that the corner has a final arc angle, a difference between the final arc angle and the initial arc angle being between 2.3 degrees and 13.6 degrees; and
    compressing the composite material, thereby consolidating the composite material with the corner having the final arc angle.

12. The method of claim 11, wherein the step of changing the orientation comprises transferring the composite material from a layup tool having the initial arc angle to a curing tool having the final arc angle.

13. The method of claim 11, wherein the step of changing the orientation comprises removing inserts from a surface of a layup tool on which the composite material is placed during the step of laying up the composite material.

14. The method of claim 11, wherein the step of changing the orientation comprises at least one of electromechanically, pneumatically, and hydraulically actuating at least one surface of a layup tool on which the composite material was placed during the step of laying up the composite material such that the corner has the final arc angle.

15. The method of claim 14, wherein actuating the at least one surface of the layup tool occurs in an oven during curing of the composite material and before gelation of the composite material.

16. The method of claim 11, wherein the step of laying up the composite material is performed on a layup tool, wherein the layup tool is low-melt alloy or phase-change material coupled with at least one of springs and weights, wherein the step of changing the orientation comprises heating or cooling the layup tool to a specific phase change threshold temperature, in an oven, which actuates the layup tool to move the composite material such that the corner has the final arc angle.

17. The method of claim 16, wherein the specific phase change threshold temperature is provided to the layup tool in the oven during curing of the composite material and before gelation of the composite material.

18. The method of claim 11, wherein the step of laying up the composite material is performed on a layup tool, wherein a surface of the layup tool is attached to a bi-metallic strip configured to release at least one of pressure, weight, and springs that actuate the surface of the layup tool at one of predetermined times and temperatures without user intervention.

* * * * *